United States Patent [19]
Nakanishi

[11] Patent Number: 5,499,667
[45] Date of Patent: Mar. 19, 1996

[54] DRILL/CUTTING BIT, AND METHOD OF MAKING STRUCTURAL JOINT

[75] Inventor: Teruo Nakanishi, Kyoto, Japan

[73] Assignee: Nakanishi Construction Company, Japan

[21] Appl. No.: 263,338

[22] Filed: Jun. 21, 1994

[51] Int. Cl.[6] .................. B27M 1/00; B27C 1/00
[52] U.S. Cl. .............. 144/365; 144/134 R; 144/136 R; 144/150; 144/218; 144/219; 144/220; 144/240; 144/371; 144/353; 407/30; 407/54
[58] Field of Search ............ 144/134 R, 134 A, 144/150, 218, 219, 220, 240, 371, 365, 353; 407/30, 53, 54

[56] References Cited

U.S. PATENT DOCUMENTS

| | | | |
|---|---|---|---|
| 803,295 | 10/1905 | Laskowitz | 144/220 |
| 1,316,959 | 9/1919 | Keiser | 144/219 |
| 1,328,430 | 1/1920 | Hathaway | 144/240 |
| 1,409,258 | 3/1922 | Stenger | 144/219 |
| 1,459,534 | 6/1923 | Hilker | 144/219 |
| 3,606,916 | 9/1971 | Day | 144/134 P |
| 4,470,733 | 9/1984 | Marques, Jr. | 144/240 |
| 4,593,734 | 6/1986 | Wallace | 144/240 |
| 4,741,370 | 5/1988 | Heaton | 144/136 R |

FOREIGN PATENT DOCUMENTS

| | | | |
|---|---|---|---|
| 234389 | 5/1911 | Germany | 144/240 |
| 288592 | 11/1915 | Germany | 144/240 |
| 11369 | 3/1920 | United Kingdom | 144/240 |

*Primary Examiner*—W. Donald Bray
*Attorney, Agent, or Firm*—Klima & Hopkins

[57] ABSTRACT

A drill/cutting tool for making joints in wooden members for receiving a metal plate connector. The drill/cutting tool can bore a hole, and then simultaneously cut a smaller width groove and larger width groove from the hole to complete forming the joint. Also, a method of making a joint in wood members.

14 Claims, 5 Drawing Sheets

DRILL/CUTTING BIT, AND METHOD OF MAKING STRUCTURAL JOINT

FIELD OF THE INVENTION

The present invention is directed to a cutting bit, particularly a cutting bit for cutting a joint in a wooden member, and a method of making a joint with such a single cutting bit.

BACKGROUND OF THE INVENTION

There are various woodworking methods employed in the construction of buildings with wooden members. As shown in FIG. 5 to 7, a so called "metal fit" joint is illustrated using a metal plate connector A having a pair of metal protrusions 63 and 64. The "metal fit" joint is used for connecting a horizontal wooden member to a vertical wooden member having a special slot to be discussed below. The metal protrusions 63 and 64 are provided with end plates 65 and 66, respectively. The end plates 65 and 66 can be attached, for example, by welding. The metal plate 60 is provided with a hole 62 and a U-shaped slot 61 for connecting the metal plate to the horizontal wooden member using bolts. A metal fitting B defined by a metal plate 70 having a slot 71 and four holes 72 is used as a backing plate for the horizontal wooden member.

The method of forming the joint is illustrated in FIGS. 9 through 13. The horizontal member or beam 90 has holes 91 and 92 which corresponds to the slot 61 and the hole 62 in plate A. The beam 90 also has an end slit at its end (not shown). The holes 81, 82 are drilled into the vertical member or column 80. The metal protrusions arms 63 and 64 having welded metal end plates 65 and 66 are inserted into the previously drilled holes 81 and 82 in the column 80, as shown in FIG. 9.

Once the metal end plates 65 and 66 are fully fitted into the drilled holes 81 and 82, the metal plate connector A is hit downwardly with an appropriate tool to set the metal plate connector A firmly in the column 80, as shown in FIG. 10.

As shown in FIG. 11, a pin 93 having a D-pin shaped cross section is inserted into the previously drilled hole 91 in the beam 90. The beam 90 is then moved in the direction of the arrow all the way so that the end grain of the beam 90 meets the column 80 completely.

The beam 90 is then pushed down from its upper side until the pin 93 registers with the bottom of slot 61, as shown in FIG. 12. The beam 90 is further forced downwardly with appropriate pressure, and the pin 94 is inserted through the hole 92 in the beam 90, and through hole 62 of the plate A. Nuts are threaded onto and tightened on the pins 93 and 94.

In order to use the metal plate connector A to connect the beam 90 to the column 80, it is necessary to provide joints 110 and 120 in the column 80.

The joints 110 and 120 are made by first drilling holes 81 and 82 in the column 80. Top plan view of the holes 81 and 82 are shown in FIG. 14. Here, the pair of holes 81 and 82 are drilled in the wood member 100 with a drill bit. Secondly, smaller width slots 112 and 122 are made extending from the holes 81 and 82 with a rotary cutting bit. Thirdly, larger width slots 113 and 123 are made extending from the holes 81 and 82 with a different rotary bit.

Thus, the holes 81 and 82 having cylinder shaped cross sections, slots 112, 122 have rectangular shaped cross sections, and slots 113 and 123 have rectangular shaped cross sections. The slots 113 and 123 are positioned at a lower side of the slits 112, 122.

In order to make joints 110 and 120, three (3) different types of drills or cutting tools are required. Specifically, the tools required are as follows:

1. a first cutting bit for making holes 81 and 82 having cylindrical shaped cross sections, and oriented substantially perpendicular to the surface of the column;
2. a second cutting bit for making the small width slots 112 and 122 extending from the holes 81 and 82, and the smaller width slots 112 and 122 are cut to have a first predetermined depth extending inwardly from the surface of the column; and
3. a third cutting bit for making the larger width slots 113 and 123 extending from the holes 81 and 82, the larger width slots 113 and 114 are cut to have a second predetermined depth extending from the bottom of the smaller width groove further into the column.

As explained above, such drilling method requires three (3) different tools including a twist drill bit, a flat drill bit and a rotary side cutting bit. To make highly accurate holes and slots, it is required that the bits be change for each cut. This requires exact setting of the drill at appropriate marks as well as setting the exact moving distance and direction of the drill. Thus, the conventional method takes a significant amount of time, and is troublesome due to the requirement of exchanging the bits, and time and trouble associated with setting the drill for accuracy with each different bit.

SUMMARY OF THE INVENTION

Thus, an object of the present invention is to provide a combined drill/cutting bit for making joints according to the present invention.

Another object of the present invention is to provide a combined drill/cutting bit for cutting a hole, smaller width slot, and a larger width slot.

A further object of the present invention is to provide a combined drill/cutting bit comprising a shank having at least one cutting blade for cutting a smaller width slot, and an end cutting blade for drill a hole and cutting a larger width slot.

An object of the present invention is to provide a method for making a joint in a wooden member.

These and other objects of the present invention can be accomplished according to the present invention.

The drill/cutting bit according to the present invention is for cutting a joint in a wooden member for cooperating with a connector of another member. The joint is typically cut in a horizontal member or column and cooperates with a connector attached to a horizontal member or beam.

The joint cut in the column receives one or more protrusions of a metal plate connector attached to the beam. The joint is cut with the drill/cutting bit according to the present invention comprising a shank, body having at least one groove with a trailing cutting edge for cutting the smaller width slot, and an end cutting blade having a bottom cutting edge for boring the hole and a side cutting blade for cutting the larger width slot. The drilling/cutting bit simultaneously cuts the smaller width slot a predetermined depth from the surface of the wooden member, and the larger width slot at a deeper predetermined depth in the wooden member just beneath the smaller width slot.

The method according to the present invention involves forming holes in wooden columns to receive protrusions of a metal plate connector of beams. The method involves using a drill/cutting bit as described above. Firstly, the drill/cutting bit is connected to a drill and placed on a side of the wooden member; and secondly, the drill/cutting tool is lowered into the hole and then moved parallel to the surface of the wooden member a predetermined distance to simultaneously cut the lesser width groove and the larger width groove.

BRIEF DESCRIPTION OF THE DRAWINGS

The invention will now be described by way of example with reference to the accompanying drawings.

DETAILED DESCRIPTION OF THE DETAILED EMBODIMENTS

Figure 1:
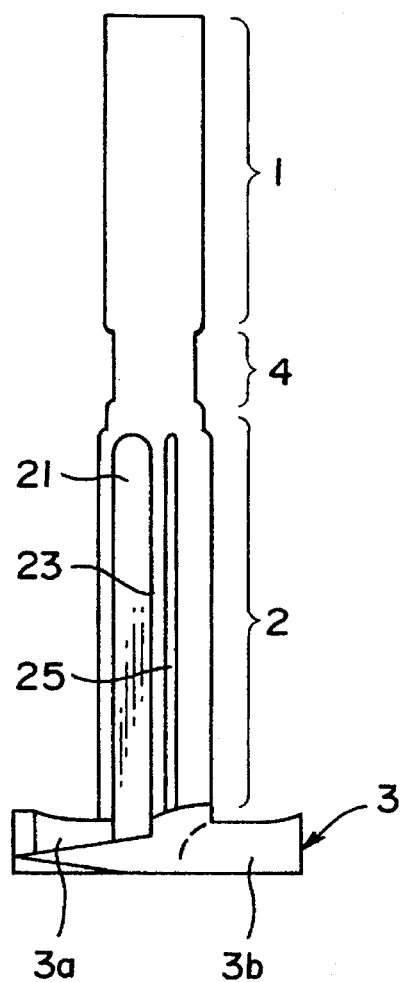
FIG. 1 is a side elevational view of a drill/cutting bit according to the present invention.

The invention will now be described by way of example. A preferred embodiment of the drill/cutting tool according to the present invention is shown in FIG. 1.

The drill/cutting tool primarily comprises a shank 1, body 2, and end cutting blade 3. A neck 4 may be provided between the shank 1 and body 2 as illustrated. The shank 1, neck 4, body 2, and end cutting blade 3 are attached in continuous manner.

Figure 2:
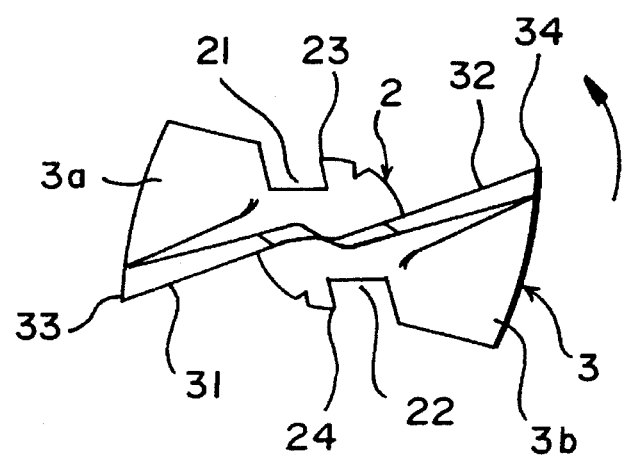
FIG. 2 is a bottom planar view of the drill/cutting bit as shown in FIG. 1.

The body 2 is provided with a pair of opposed primary grooves 21 and 22, as shown in FIG. 2, which extend in the longitudinal direction of the body 2. In this preferred embodiment, the primary grooves 21 and 22 are straight. Alternatively, the primary grooves 21 and 22 can have other shapes such as a helix, however, the straight primary grooves 21 and 22 tend to cut the fastest in the method according to the present invention.

Figure 3:
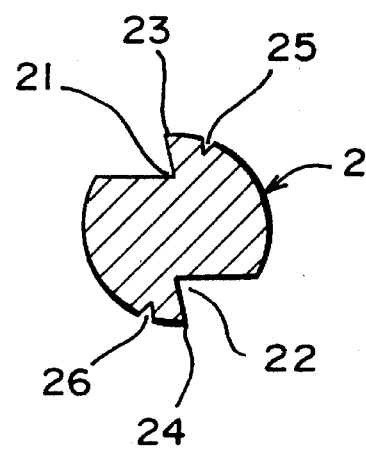
FIG. 3 is a cross-sectional view through the shank of the drill/cutting tool as shown in FIG. 1.
Figure 4:
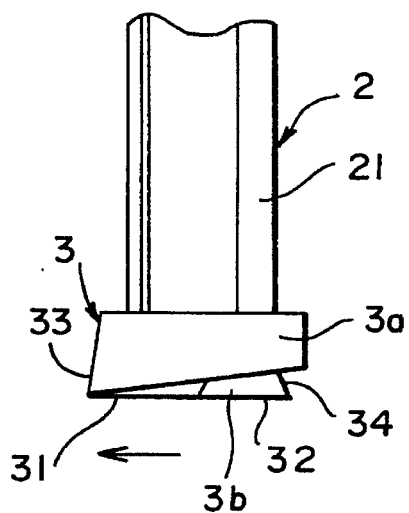
FIG. 4 is a detailed partial side view of the drill/cutting bit as shown in FIG. 1.
Figure 6:
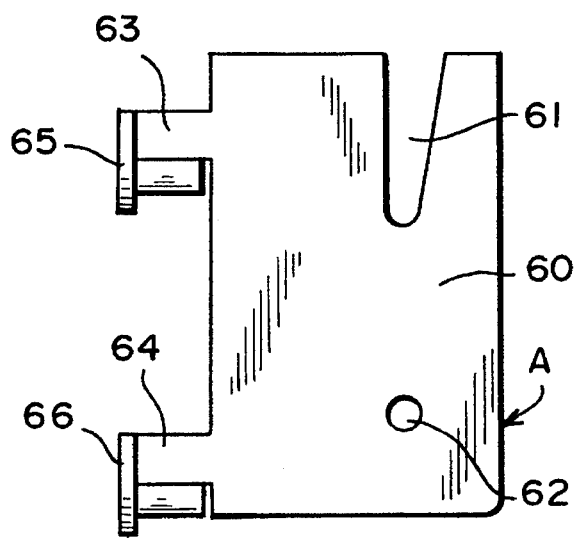
FIG. 6 is a side elevation view of the metal plate connector as shown in FIG. 5.

The trailing edges of the primary grooves 21 and 22, relative to the direction of rotation, define cutting edges 23 and 24, respectively, as shown in FIG. 3. The body 2 is also provided with opposed secondary grooves 25 and 26. The secondary grooves 25 and 26 are both smaller in width and depth relative to the primary grooves 21 and 22. Further, the secondary grooves 25 and 26 are provided in a trailing position relative to the cutting edges 23 and 24,respectively, to reduce cutting friction.

The end cutting blade 3 comprises a pair of opposed cutting blade members 3a and 3b having the shapes as shown in FIG. 2. The cutting blade members 3a and 3b are provided with side cutting edges 33 and 34, respectively. The cutting blade members 3a, 3b are constructed symmetrically and located apart at a 180 degree angle from a center axis of symmetry of the body 2.

The cutting blade members 3a and 3b are also provided with bottom cutting edges 31 and 32 located on leading edges of the cutting blades 3a and 3b relative to the direction of rotation (i.e direction of arrow).

Figure 5:
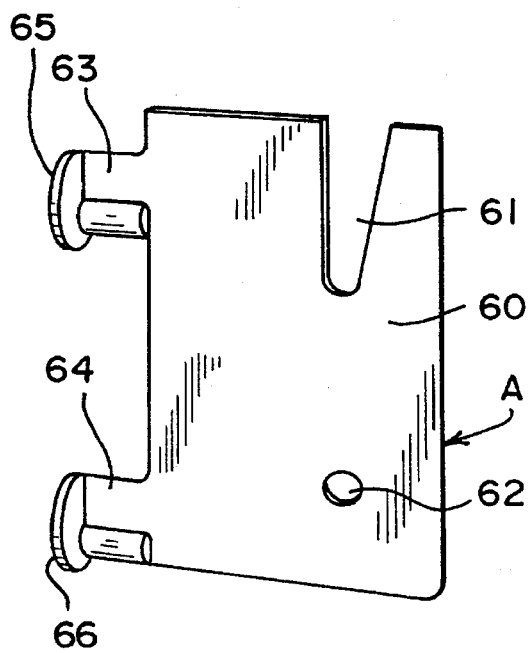
FIG. 5 is a perspective view of a metal plate connector used with the joint according to the present invention.
Figure 7:
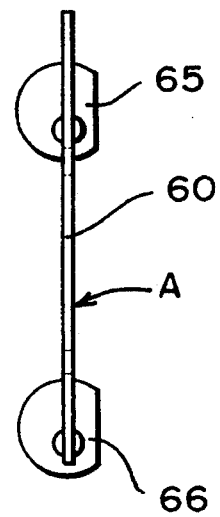
FIG. 7 is an end elevational view of the metal plate connector as shown in FIG. 5.
Figure 8:
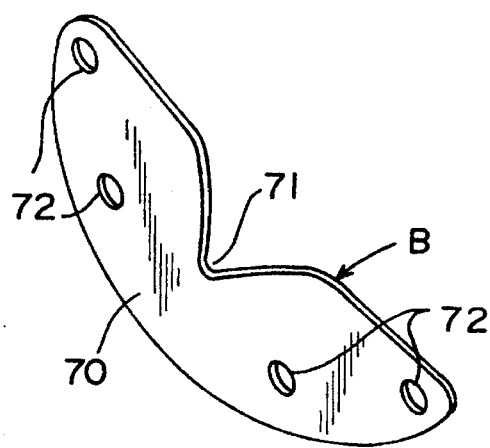
FIG. 8 is a perspective view of a metal plate used with the metal plate connector as shown in FIG. 5.
Figure 9:
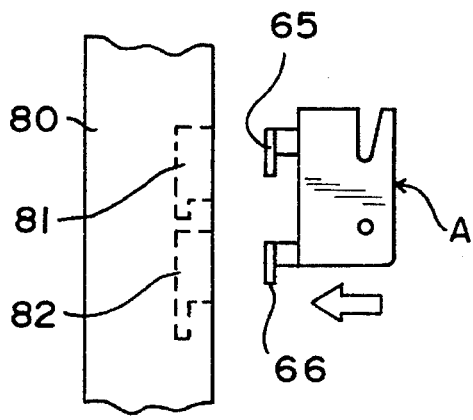
FIG. 9 is a side view illustrating the connection between a column provided with a joint according to the present invention cooperating with a metal plate connector of a beam.
Figure 10:
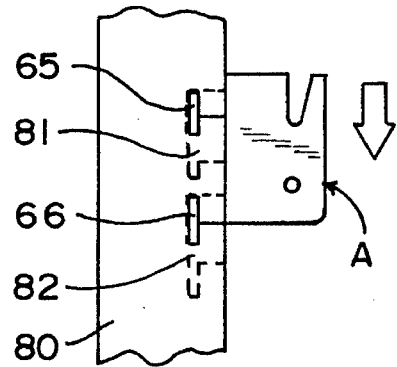
FIG. 10 is a side view illustrating the connection between a column provided with a joint according to the present invention cooperating with a metal plate connector of a beam.
Figure 11:
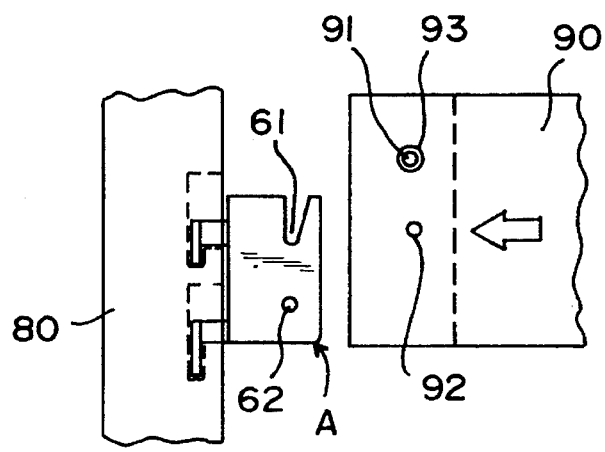
FIG. 11 is a side view illustrating the connection between a column provided with a joint according to the present invention cooperating with a metal plate connector of a beam.
Figure 12:
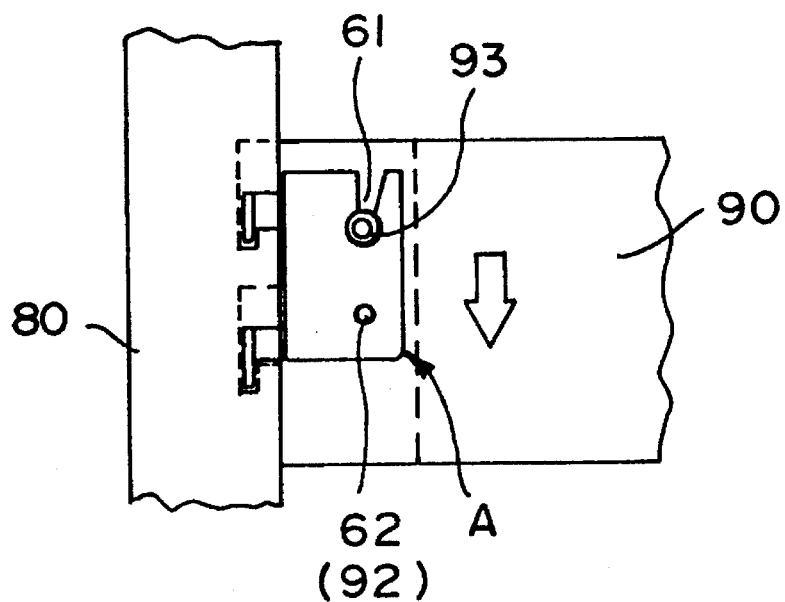
FIG. 12 is a side view illustrating the connection between a column provided with a joint according to the present invention cooperating with a metal plate connector of a beam.
Figure 13:
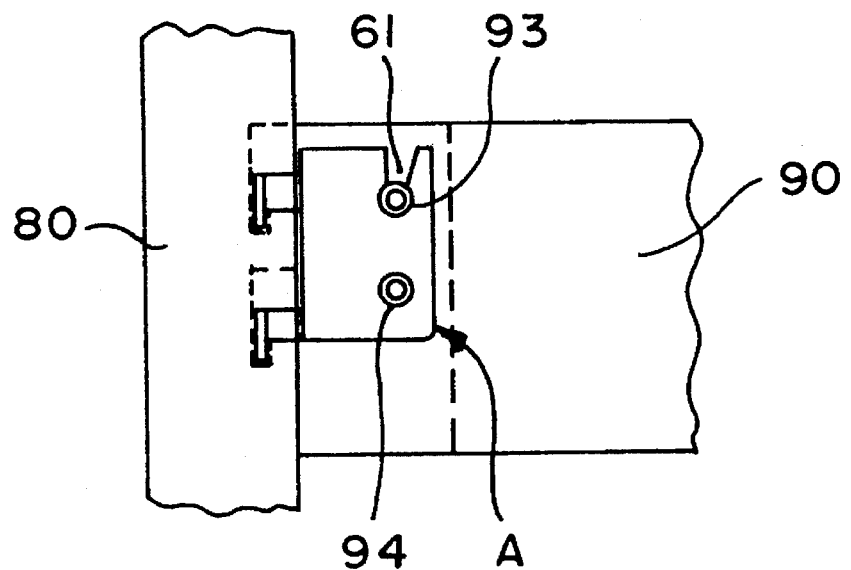
FIG. 13 is a side view illustrating the connection between a column provided with a joint according to the present invention cooperating with a metal plate connector of a beam.
Figure 14:
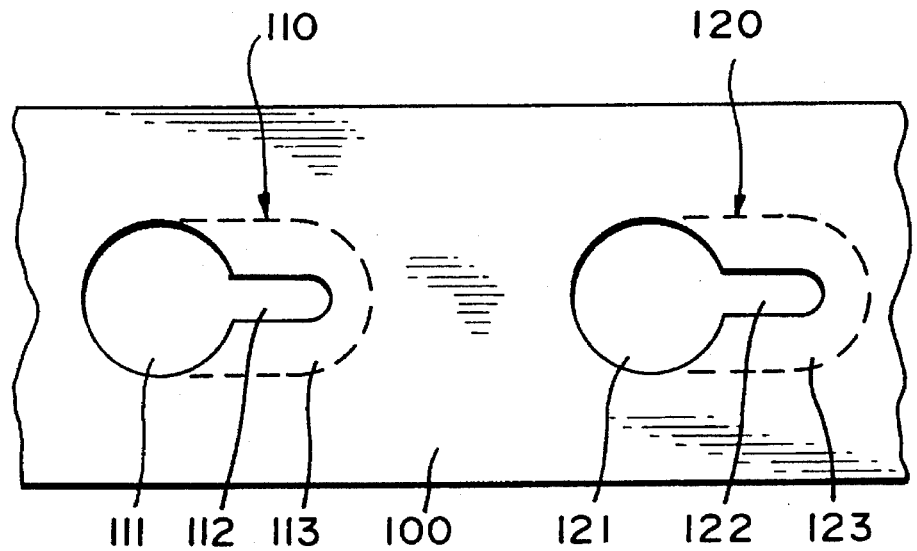
FIG. 14 is a plan view of a joint according to the present invention.

The diameter of the body 2 dictates the width of the slots 112 and 122 cut extending from holes 81 and 82, respectively, as shown in FIG. 14. The diameter of the end cutting blade 3 dictates the width of the slots 113 and 123. The thickness of the end cutting blade dictates the depth of the slots 113 and 123, and are approximately equal to the thickness of the metal end plates 65 and 66 of the metal plate connector A, as shown in FIG. 5.

Figure 15:
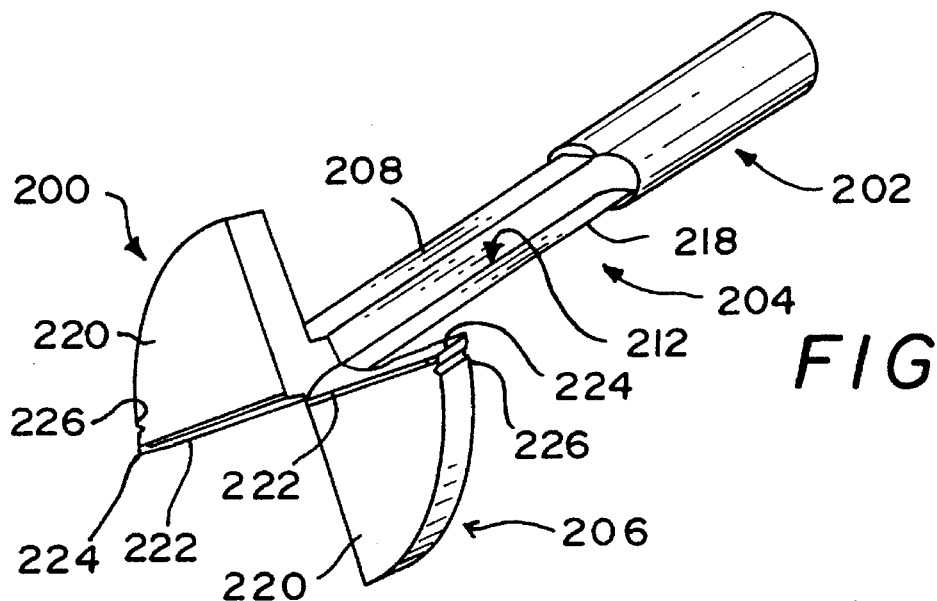
FIG. 15 is a perspective view of another embodiment of a drilling/cutting bit according to the present invention.
Figure 16:
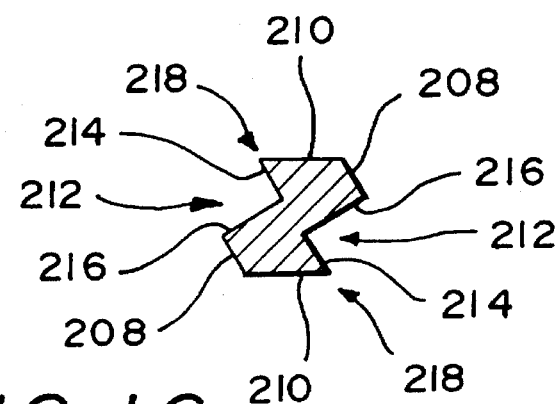
FIG. 16 is a cross-sectional view through the shank of the drill/cutting tool as shown in FIG. 15.

Another embodiment of a drilling/cutting bit according to the present invention is shown in FIGS. 15 and 16.

In this embodiment, the drilling/cutting bit 200 comprises a shank 202, a body 204, and an end cutting blade 206. The shank 202 has a round cross section for connecting to the drilling/cutting machine according to the present invention.

The body 204 has the cross-sectional shape shown in FIG. 16. Specifically, the body 204 is defined by a pair of opposed guide surfaces 208 positioned adjacent opposed surfaces 210. A pair of opposed grooves 212 are provided, and each groove 212 is defined by two surfaces 214 and 216. A pair of cutting edges 218 are trailing edges of the opposed grooves 212. The cutting edges 218 are used for cutting the smaller width slot when the bit 200 is moved sideways.

The end cutting blade 206 is defined by a pair of opposed cutting blade members 220 having bottom cutting edges 222. Specifically, the bottom cutting edges are defined by downwardly extending strips of metal extending slightly below the bottom of the cutting blade members 220, and having a leading edge serving as a cutting edge. The cutting blade members 220 are used for drilling or boring into the wooden member.

A pair of opposed cutting edges 224 are provided at the tips of the opposed cutting blade members 220. Further, a pair of grooves 226 are positioned trailing the cutting edges 224, respectively. The opposed cutting edges 224 are used for cutting the larger diameter slot in the wooden member when the bit 200 is moved sideways.

The drill/cutting bit according to the present invention is not limited to the preferred embodiment disclosed in detail above. For example, in above practice, the body 2 can be provided with three or more primary grooves providing three or more cutting edges on the body 2. As mentioned above, the primary grooves may be spiral providing two or more spiral cutting edges. Maximum cutting capacity can be achieved with more than three primary grooves having straight, spiral or other shapes.

The end cutting blade 3 can be provided with more than two blades. For example, four to fifteen blades are preferable considering the cutting capacity.

The drill/cutting bit according to the present invention is used on a drilling machine. The make the joints 110 and 120, as shown in FIG. 14. Here, in order to make a hole 110 shown in FIG. 14, the following method steps are performed:

1. a wooden member 80 to be provided with a joint according to the present invention is placed horizontally on the work stage of the drilling machine;
2. the center of the drill/cutting bit and end cutting blade 3 are positioned at the center of the hole 81 to be cut into the wooden member 80;
3. the drill/cutting tool is rotated and moved downwardly to bore the hole 81 with bottom cutting edges 31, 32 of cutting blade members 3a and 3b making the cylindrical shape hole 81.
4. the drill/cutting tool is moved downwardly to a depth so that the metal plate connector A is firmly held when inserted into the joint 110. This completes the method of making the cylindrical shaped hole 81 having a set diameter;
5. after forming the hole 81, the drill/cutting bit is moved sideways relative to the length of the wooden member. The movement of the drill/cutting bit in this manner simultaneously cuts the smaller width slot 112 and the larger width slot 113. Simultaneously, the bottom of the larger width slot is cut by the bottom cutting edges 31 and 32, which are formed at the lower surface of the cutting blade members 3a, 3b. The movement of the drill/cutting bit sideways a preselected distance dictated by the dimensions of the metal plate connector A completes the smaller width slot 112 having a set width and length and the larger width slot 113 having a set width and height.

The method according to the present invention allows joints to be made for cooperating with metal plate connectors with only one bit. Thus, there is no need to use three different cutting tools, or change and adjust the settings of the drill to accommodate the three different cutting tools. Thus, the joint can be made substantially quicker and more easy.

What is claimed is:

1. A cutting drill for use in forming holes in wood materials to accept insert protrusions of a metal plate connector used to join wooden members, comprising:

a shank;

a body connected to said shank, said body having at least one primary groove with a trailing cutting edge oriented parallel relative to a center longitudinal axis of the bit; and an end cutting blade connected to said body, said end cutting blade including a side cutting edge and a bottom cutting edge configured for cutting a rectangular groove having a substantially flat bottom, said side cutting edge having a predetermined length and being parallel relative to said trailing cutting edge, said end cutting blade having a greater cutting diameter relative to a cutting diameter of said body.

2. A drill according to claim 1, wherein said body is provided with a pair of opposed primary grooves each provided with said trailing cutting edge.

3. A drill according to claim 1, wherein said end cutting blade is defined by a pair of opposed cutting blade members.

4. A drill according to claim 3, wherein said bottom cutting edge is defined by a pair of opposed bottom cutting edges provided, respectively, on said pair of opposed cutting blade members.

5. A drill according to claim 4, wherein said bottom cutting edges are continuous, and are defined by a pair of straight parallel bottom cutting edges, which transitions at a center of said bottom cutting edge.

6. A drill according to claim 3, wherein said side cutting edge is defined by a pair of opposed side cutting edges provided, respectively, on said pair of opposed cutting blade members.

7. A drill according to claim 1, wherein said body is provided with a secondary groove trailing said primary groove for reducing friction during cutting.

8. A drill according to claim 7, wherein said secondary groove is more shallow than said primary groove.

9. A drill according to claim 7, wherein said primary groove is defined by a pair of opposed grooves, and said secondary groove is defined by a pair of opposed grooves positioned in a trailing position, respectively, relative to said primary grooves.

10. A drill according to claim 1, wherein said trailing cutting edge of said body and said side cutting blade of said end cutting blade are configured for cutting sideways, and said bottom cutting edge of said end cutting blade is configured for boring.

11. A method for making a joint in a wooden member, comprising the steps of:

boring a substantially perpendicular hole in a side of said wooden member;

cutting a first slot of smaller width at a first predetermined depth from a surface of the wooden member while simultaneously cutting a slot of larger width at a second predetermined depth inside said wooden member from said hole in a direction along the side of said wooden member.

12. A method according to claim 11, wherein said first slot and said second slot a cut simultaneously with a single tool.

13. A method according to claim 12, wherein said tool is defined by a cutting drill, comprising:

a shank having at least one primary groove extending along a longitudinal direction of said shank;

a shank cutting blade positioned along said shank; and an end cutting blade positioned at an end of said shank, said end cutting blades having a greater diameter relative to said shank cutting blades, and said cutting drill is moved relative to the side of the wooden member to cut said first and second slots.

14. A method according to claim 13, wherein said drilling bit is moved transversely.

\* \* \* \* \*